United States Patent [19]
Fukuyama et al.

[11] 4,272,711
[45] Jun. 9, 1981

[54] MALFUNCTION DETECTING SYSTEM

[75] Inventors: Hiroomi Fukuyama, Kanagawa; Shinichi Isobe, Tachikawa, both of Japan

[73] Assignee: Fujitsu Fanuc Limited, Japan

[21] Appl. No.: 34,143

[22] Filed: Apr. 27, 1979

[30] Foreign Application Priority Data

Apr. 28, 1978 [JP] Japan .................................. 53/51693

[51] Int. Cl.³ ............................................ G05B 23/02
[52] U.S. Cl. .................................... 318/565; 340/679
[58] Field of Search ............... 318/565, 569; 340/680, 340/679

[56] References Cited

U.S. PATENT DOCUMENTS

| | | | |
|---|---|---|---|
| 3,633,087 | 1/1972 | Vawter et al. | 318/565 |
| 3,719,878 | 3/1973 | Ferguson et al. | 318/565 |
| 4,130,787 | 12/1978 | Allaire et al. | 318/565 |
| 4,163,930 | 8/1979 | Lachaussee | 318/565 X |

*Primary Examiner*—B. Dobeck
*Attorney, Agent, or Firm*—Staas & Halsey

[57] ABSTRACT

In a numerical control unit which has an interpolation function from generating command pulses in response to a distribution command and a servo system for driving a movable part of a machine in accordance with command pulses, a comparison is made between the error of the servo system a predetermined period of time after the distribution command is switched off and a preset value; when the error of the servo system is larger than the predetermined value, an alarm signal is produced to detect the occurrence of a malfunction.

4 Claims, 4 Drawing Figures 4,272,711

MALFUNCTION DETECTING SYSTEM

BACKGROUND OF THE INVENTION

1. Field of the Invention

This invention relates to a malfunction detecting system which detects malfunctions of a servo system and the like in a numerical control unit to provide for enhanced reliability in numerical control.

2. Description of the Prior Art

A numerical control unit has an interpolation function for generating command pulses in response to a distribution command and includes a servo system responsive to the command pulses to drive a movable part of a machine.

By way of example, a servo system has an error register supplied with command pulses and feedback pulses to store difference therebetween. A servo motor is driven so that the content of the error register is reduced to zero. In this servo system, during emission of the command pulses, the content of the error register assumes a certain value; but when the delivery of the command pulse is interrupted or completed by turning the distribution command OFF, the value of the error register gradually decreases to become smaller than a certain value $\epsilon_0$ after a certain period of time $\tau$.

In the following cases, however, the content of the error register may sometimes be larger than the value $\epsilon_0$ at a time $\tau$ after the distribution on command is turned OFF:

(1) Error register failure: A certain bit or bits remain "1".

(2) Interpolator failure: In spite of the absence of a distribution command, a command pulse is generated.

(3) Speed control servo system failure: In spite the absence of a move command, the servo motor is driven to yield feedback pulses.

In another example of a conventional servo system the phase difference between a command phase signal and a feedback phase signal is used to drive the servo motor so that to reduce the phase difference to zero. Also in such a servo system, the phase difference signal occurring at time $\tau$ after the distribution command is turned OFF may be in some cases larger than the certain value $\epsilon_0$ owing to the aforesaid failures in the respective parts.

SUMMARY OF THE INVENTION

The purpose of this invention is to provide a malfunction detecting system for a numerical control unit which detects malfunctions of an error register, an interpolator and a speed control servo system by checking whether or not the error in the servo system is larger than a predetermined value a certain period of time after of a distribution command is turned OFF.

Briefly stated, the malfunction detecting system of this invention employs comparator means by which the error in a servo system a certain period of time after the distribution command is turned OFF is compared with a predetermined value; when the comparator means detects that the error in the servo system is in excess of the predetermined value, an alarm signal is generated to indicate the occurrence of a malfunction.

DESCRIPTION OF THE PREFERRED EMBODIMENTS

Figure 1:
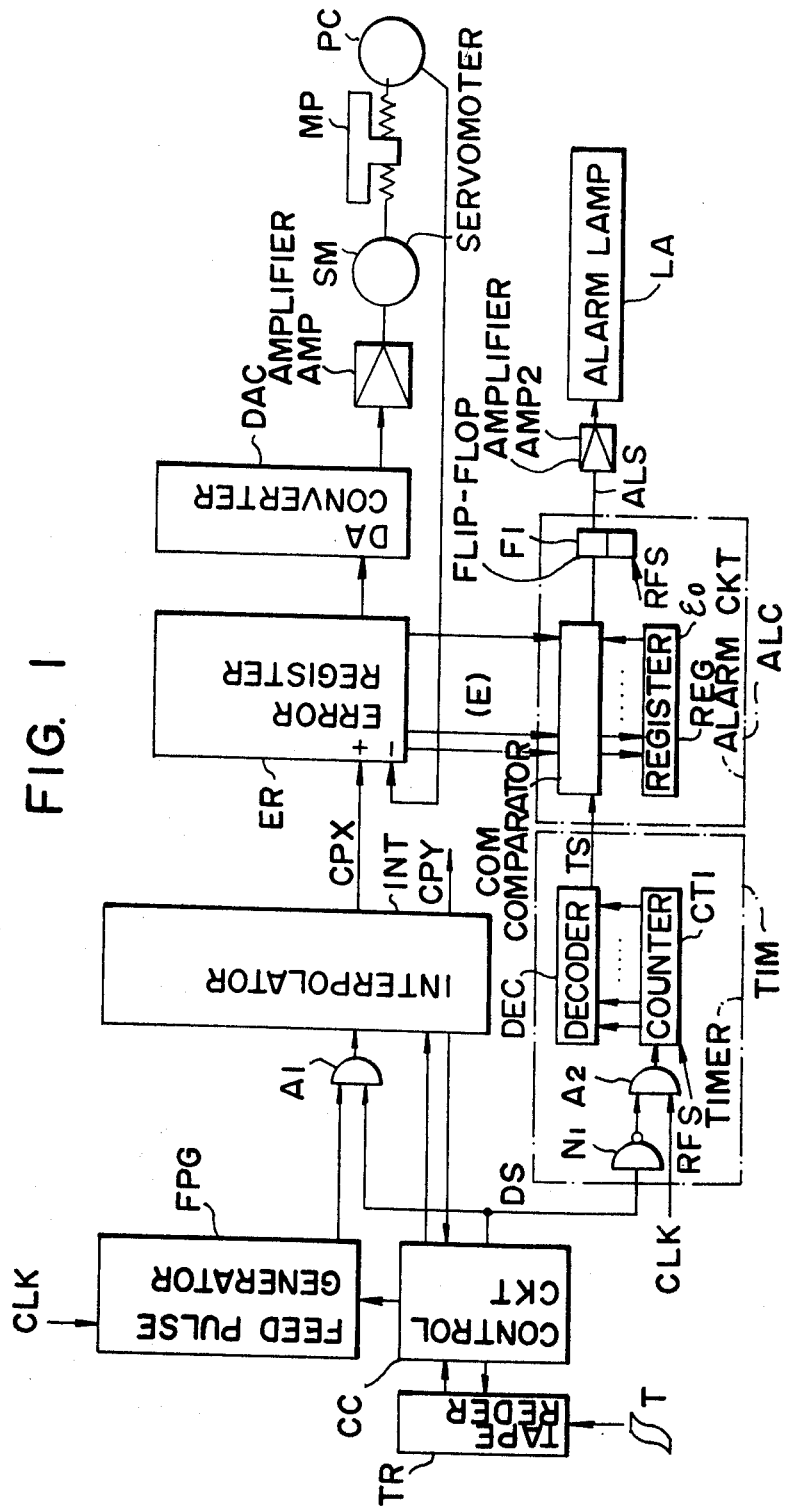
FIG. 1 is a block diagram illustrating a numerical control unit in accordance with an embodiment of this invention.

In FIG. 1, reference character T indicates a command tape, which has recorded thereon respective axis command values and feed rate information; and TR designates a tape reader, which is started and halted under the control of a control circuit CC. The respective axis values and the feed rate information read via the tape reader TR are respectively written in an interpolator INT and a feed pulse generator FPG under the control of the control circuit CC. Upon completion of this write, the control circuit CC turns ON a distribution command DS, by which feed pulses from the feed pulse generator FPG are applied via a gate A1 to the interpolator INT to start pulse distribution. In the present embodiment, the interpolator INT is shown to be of two axes (X, Y) and generates command pulses CPX and CPY respectively corresponding to the axis command values.

The X-axis command pulses are added in an error register ER and the added value is converted by an D-A converter DAC into an analog voltage signal proportional to the added value, which signal is provided via an amplifier AMP to a servo motor SM to drive it. By the servo motor SM a movable part MP of a machine is moved in the X-axis direction and this movement is converted into feedback pulses by means of a detector comprising a pulse coder PC. The feedback pulses are each applied to the error register ER to reduce its value one by one. The servo system for the Y-axis is exactly identical with that of for the X-axis, and hence is not shown in FIG. 1.

In such a servo system as described above, when the delivery of the command pulses CPX is interrupted or completed by turning the distribution command DS OFF, the value of the error register ER is gradually reduced by the sequential application of the feedback pulses. The degree of reduction in this value is dependent on the delay of the servo system used; but, in the case of a normal operation, the value of the error register ER does not exceed a certain value $\epsilon_0$ at time $\tau$ after the interruption or completion of the delivery of the command pulse CPX.

Therefore, in this embodiment, the value $\epsilon_0$ (which is preferably minimized) is preset and, on the basis of a delay (a time constant) of the servo system, the time $\tau$ is preset to be long enough to permit the content of the error register ER to decrease to a value smaller than $\epsilon_0$ after the distribution command is turned OFF; when the preset time $\tau$ after the distribution command was turned OFF has elasped, a comparison is made between the content E of the error register ER and the aforesaid preset value $\epsilon_0$ and, if $E > \epsilon_0$, an alarm signal ALS is produced.

In FIG. 1 reference character TIM indicates a timer, which includes a NOT circuit N1, an AND gate A2, a counter CT1 and a decoder DEC. Reference character CLK designates a clock pulses and RFS identifies a counter reset signal which occurs in response to each rise and fall of the distribution command DS. Accordingly, in the timer TIM, when the distribution command DS is switched OFF, the counter CT1 is reset by the signal RFS and then counts the clock pulses CLK and when its count value reaches a predetermined value C1, the decoder DEC provides a trigger signal TS. In order that the trigger signal TS may occur the time $\tau$ after the distribution command DS is switched OFF, the aforesaid value C1 is selected in accordance with the rate of the clock pulses CLK.

The alarm circuit ALC includes a comparator COM, a register REG for setting the predetermined value $\epsilon_0$ and a flip-flop F1. The comparator COM responds to the trigger signal TS from the timer TIM to compare the value E of the error register ER with the value $\epsilon_0$ set in the register ER and set the flip-flop F1 only when $E > \epsilon_0$. The set output of the flip-flop F1 represents the alarm signal ALS, which is provided via an amplifier AMP2 to an alarm lamp LA to light it.

In the embodiment shown in FIG. 1, the timer TIM may also be a monostable multivibrator and, in the case of a computer numerical control unit (CNC), the functions of the counter CT1 and the register REG may also be achieved by assigning some specific addresses of a memory attached to a central processing unit (CPU) and the decoder DEC and the comparator COM can be replaced with a decision function of the control processing unit.

Figure 2:
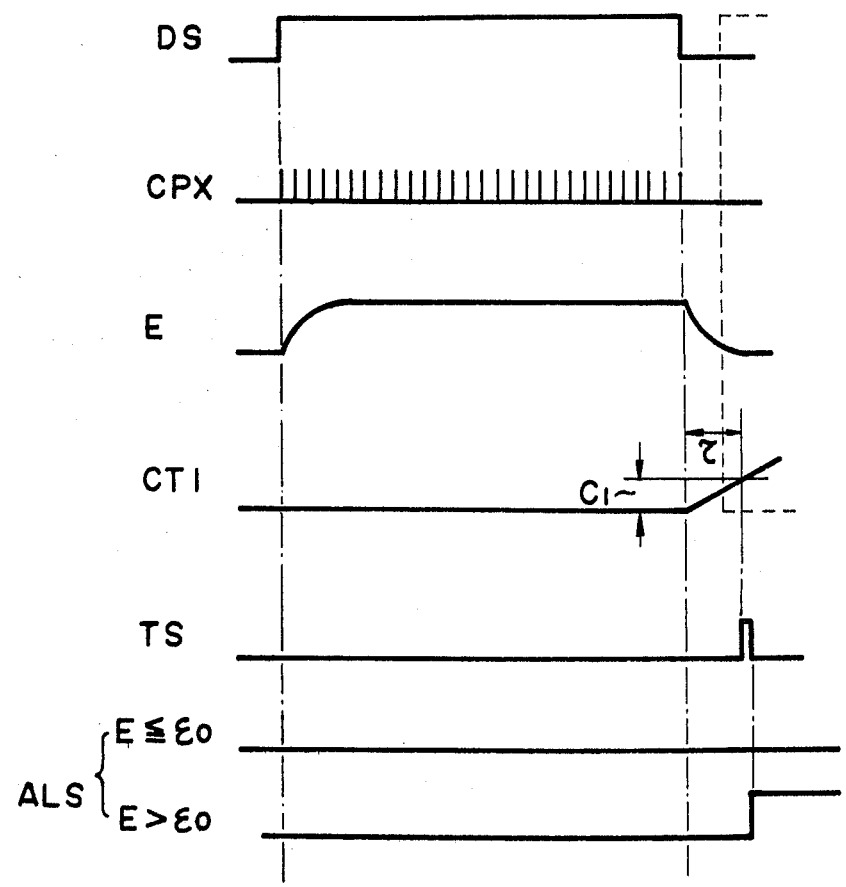
FIG. 2 shows waveforms of signals occurring in FIG. 1.

FIG. 2 shows waveforms of the respective signals in FIG. 1. The delivery of the command pulses CPX starts when the distribution command DS is turned ON and ends when it is turning OFF. The value E of the error register ER exponentially increases the command pulses CPX begin, becomes stable in the neighborhood of a certain value in a steady state, and exponentially decreases upon completion of the delivery of the command pulses CPX. The counter CT1 is reset with rise and fall of the distribution command DS and counts the clock pulses when the distribution command is OFF, so that when the count value of the counter CT1 has reached the predetermined value C1, that is, the time $\tau$ after the distribution command DS is turned OFF, the trigger signal TS is yielded. With the trigger signal TS, the content E of the error register ER and the predetermined value $\epsilon_0$ are compared with each other and if $E > \epsilon_0$, the alarm signal ALS is provided.

In the case where the distribution command DS is issued again before the lapse of time $\tau$ after interruption of the distribution command DS, as indicated by the broken lines in DS and CT1 in FIG. 2, the counter CT1 is reset; therefore, the trigger signal TS is not generated.

Figure 3:
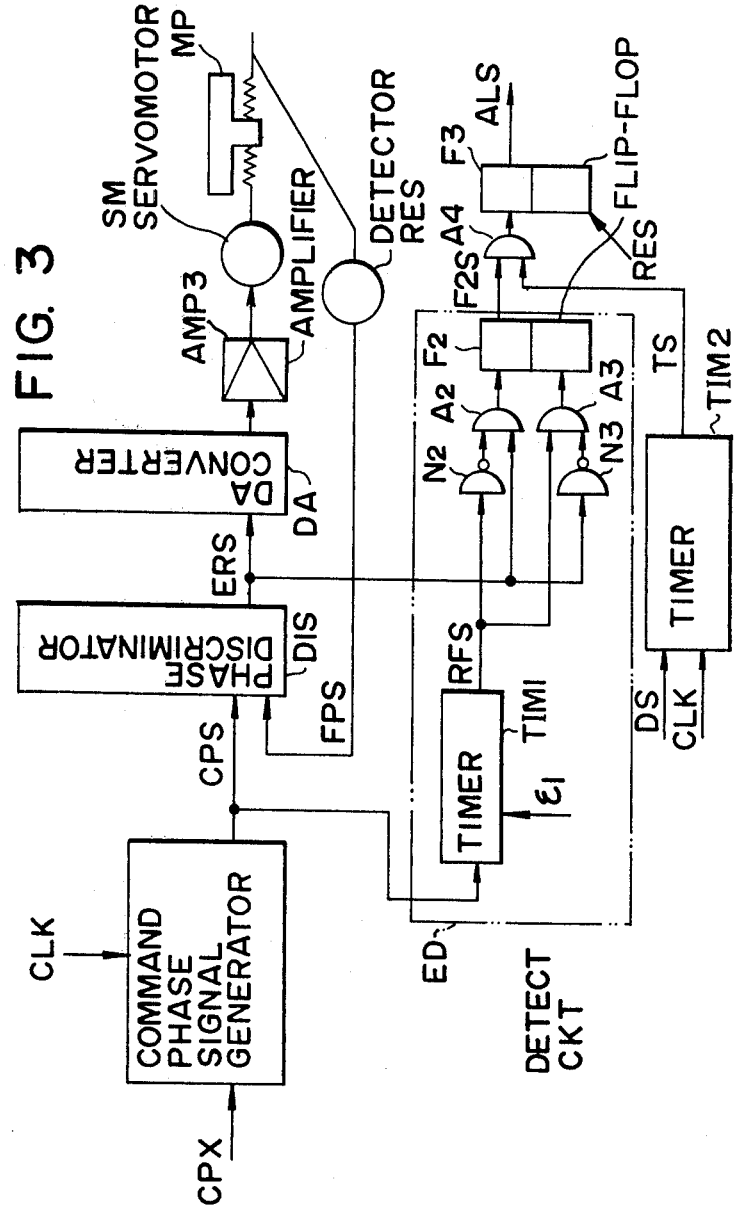
FIG. 3 is a block diagram illustrating a numerical control unit equipped with a phase control servo system in accordance with another embodiment of this invention.

FIG. 3 illustrates in block form another embodiment of this invention as being applied to a phase control servo system. In the pulses control servo system, the command pulse CPX are provided to a command phase signal generator CPGC to advance or delay the phase of the command phase signal CPS.

The movement of the movable machine part MP is detected by a detector RES, such as a resolver, an inductosyn or the like, to advance or delay the phase of the feedback phase signal FPS. A phase discriminator DIS is supplied with both of the signals CPS and FPS to yield a phase error signal ERS between the command phase signal CPS and the feedback phase signal FPS, driving a servo motor SM via a D-A converter DA and an amplifier AMP3 to move the movable part MP. This control is accomplished until the feedback phase coincides with the command phase to reduce the phase difference signal ERS to zero.

In FIG. 3, a detect circuit ED is provided for detecting whether or not the error signal ERS in the servo system is in excess of a predetermined value. The detect circuit ED includes a timer TIM1, NOT circuits N2 and N3, AND gates A2 and A3 and a flip-flop F2. The timer TIM1 rises at a zero crossing point of the command phase signal to provide a pulse signal (a reference signal) RFS having a predetermined width $\epsilon_1$. The aforementioned error signal ERS is a pulse signal which rises at the zero crossing point of the command phase signal and has a width corresponding to the phase difference between the command signal and the feedback signal. Accordingly, in the case where the error signal ERS is larger than the reference signal RFS, the flip-flop F2 is always in its set state to provide a signal F2S.

A timer TIM2 which generates at trigger signal TS the time $\epsilon_0$ after the distribution command DS is switched OFF is identical in construction with the timer employed in the aforesaid embodiment. When the trigger signal TS occurs, if the signal F2S is ON, a flip-flop F3 is set via an AND gate A4 to produce the alarm signal ALS.

Figure 4:
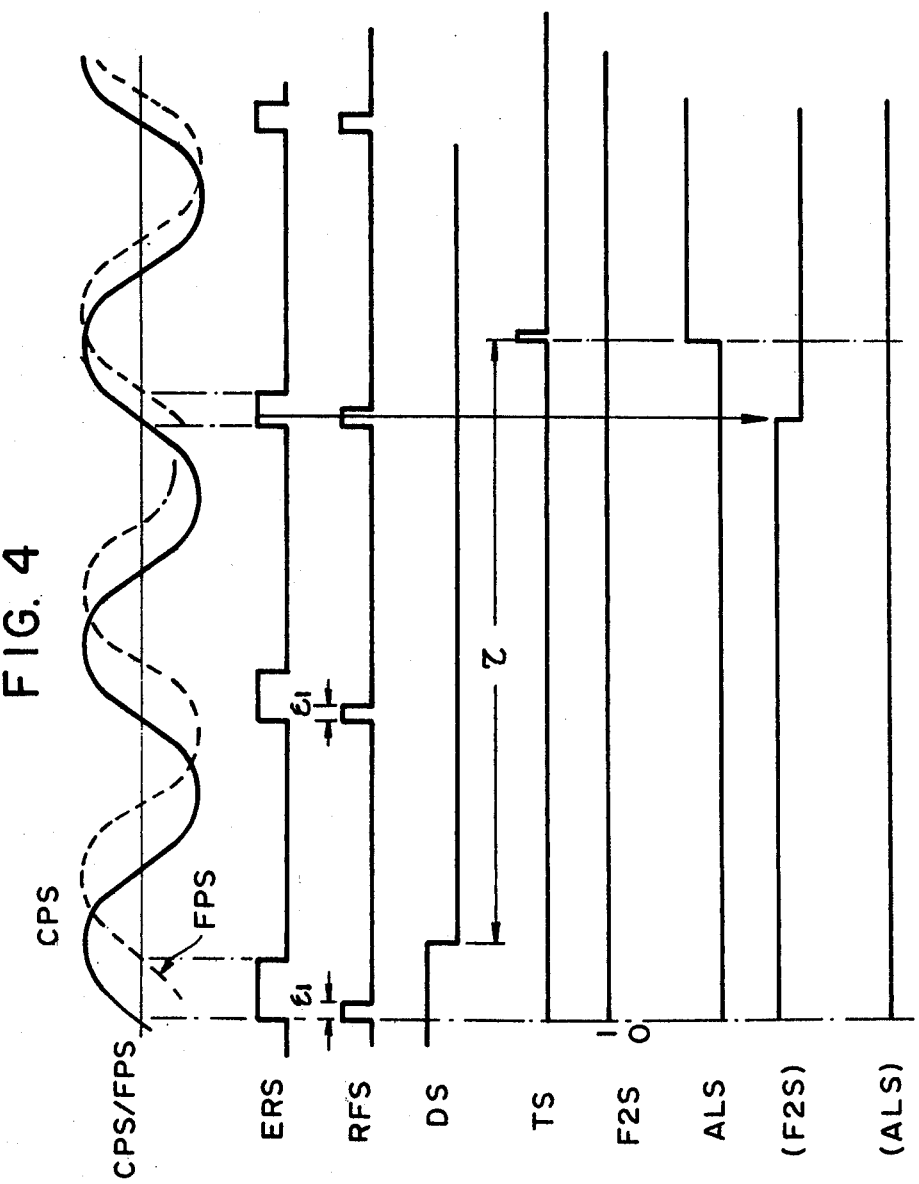
FIG. 4 shows waveforms of signal occurring in FIG. 3.

FIG. 4 shows waveforms of the signals occurring in FIG. 3. In FIG. 4, the command phase signal CPS and the feedback phase signal FPS have the same period in their steady state and their phases represent the commanded position and the position of the movable machine part. In the illustrated embodiment, the error signal ERS is obtained as a rectangular wave which rises at the zero crossing point of the command phase signal CPS and falls at the zero crossing point of the feedback phase signal FPS. The reference signal RFS is a rectangular wave which rises at the zero crossing point of the command phase signal CPS and has a predetermined width $\epsilon_1$.

When the trigger signal TS is produced at time $\tau$ after switching OFF of the distribution command DS, if the signal F2S is ON ("1"), it means that the error signal is excessively large and the alarm signal ALS is provided. If the error signal ERS has become smaller than the reference signal RFS prior to occurrence of the trigger signal TS, as indicated by the broken line, the set output F2S of the flip-flop F2 is OFF ("0"), as indicated by (F2S), so that the alarm signal remains OFF, as indicated by (ALS).

As has been described in the foregoing, according to the present invention, when an error signal occurring a predetermined period of time after switching a distribution command OFF is in excess of a certain value, an alarm signal is produced; therefore, it is possible to easily detect failures of an interpolation function, a speed control servo system and an error register, thereby to provide for enhanced reliability in a numerical control unit.

It will be apparent that many modifications and variations may be effected without departing from the scope of novel concepts of this invention.

What is claimed is:

1. A malfunction detecting system for a numerical control unit having an interpolation means for generating command pulses in response to a distribution command and having a servo system means for generating an error signal to drive a movable part of a machine in accordance with the command pulses, comprising: means for making a comparison between the error signal generated by the servo system means and a preset value at a predetermined period of time after the distribution command is switched OFF, and means for generating an alarm signal if the means for making a comparison detects that the error signal exceeds the preset value upon expiration of the predetermined period of time.

2. A malfunction detecting system according to claim 1, wherein the servo system means comprises error register means for storing the difference between a command signal and a feedback signal and wherein the means for making a comparison comprises a comparator connected to the error register and to a register for storing the present value.

3. A malfunction detecting system according to claim 1, wherein the servo system means comprises means for generating a phase difference signal between a command phase signal and a feedback phase signal and wherein the means for making a comparison comprises timer means for generating a pulse reference signal with pulsewidth corresponding to the predetermined value and means for comparing the phase difference signal and the reference signal from the timer means.

4. A malfunction detecting system according to claim 1, 2, or 3, wherein the means for making a comparison further comprises a timer started when the distribution command is switched OFF, and wherein the comparison is accomplished at said predetermined period of time after the starting of the timer.

* * * * *

UNITED STATES PATENT AND TRADEMARK OFFICE
CERTIFICATE OF CORRECTION

PATENT NO. : 4,272,711
DATED : June 9, 1981
INVENTOR(S) : Hiroomi Fukuyama et al.

It is certified that error appears in the above-identified patent and that said Letters Patent are hereby corrected as shown below:

Front page, [73] Assignee, after "Limited," insert --Tokyo,--;

Front page, [57] Abstract, line 3, "from" should be --for--;

Column 1, line 35, "1" should be --"1."--;

Column 1, line 41, after "system" insert --,--;

Column 1, line 44, "that" should be --as--.

Column 2, line 63, after "when" delete ";".

Column 3, line 4, delete "a" (first occurrence);

Column 3, line 38, after "increases" insert --when--.

Signed and Sealed this

Twentieth Day of October 1981

[SEAL]

Attest:

GERALD J. MOSSINGHOFF

Attesting Officer    Commissioner of Patents and Trademarks